(12) United States Patent
Allgaier et al.

(10) Patent No.: US 8,465,392 B2
(45) Date of Patent: Jun. 18, 2013

(54) METHOD FOR OPERATING A VEHICLE HYBRID DRIVE TRAIN HAVING AN INTERNAL COMBUSTION ENGINE AND HAVING AN ELECTRIC MACHINE

(75) Inventors: Bernd Allgaier, Kressbronn (DE); Michael Sohler, Isny (DE); Peter Schiele, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 99 days.

(21) Appl. No.: 13/123,735

(22) PCT Filed: Nov. 18, 2009

(86) PCT No.: PCT/EP2009/065350
§ 371 (c)(1),
(2), (4) Date: Apr. 12, 2011

(87) PCT Pub. No.: WO2010/063574
PCT Pub. Date: Jun. 10, 2010

(65) Prior Publication Data
US 2011/0281685 A1    Nov. 17, 2011

(30) Foreign Application Priority Data
Dec. 2, 2008   (DE) .................. 10 2008 044 272

(51) Int. Cl.
*B60K 1/02* (2006.01)
(52) U.S. Cl.
USPC ................... 477/3; 477/20; 903/912

(58) Field of Classification Search
USPC ............. 477/2, 3, 6, 7, 15, 20, 70; 903/912, 903/945, 906; 180/65.285, 65.6
See application file for complete search history.

(56) References Cited

U.S. PATENT DOCUMENTS

| | | | |
|---|---|---|---|
| 5,474,428 A | 12/1995 | Kimura et al. | |
| 6,705,416 B1 | 3/2004 | Glonner et al. | |
| 6,799,109 B2 | 9/2004 | Nakamori et al. | |
| 7,316,283 B2 | 1/2008 | Yamamoto et al. | |
| 7,730,982 B2 | 6/2010 | Hidaka et al. | |
| 7,951,043 B2 * | 5/2011 | Reisch et al. ................. | 477/156 |

FOREIGN PATENT DOCUMENTS

| | | |
|---|---|---|
| DE | 199 17 665 A1 | 10/2000 |
| DE | 10 2004 043 587 A1 | 3/2006 |

(Continued)

*Primary Examiner* — Justin Holmes
(74) *Attorney, Agent, or Firm* — Davis & Bujold, PLLC

(57) ABSTRACT

A method of operating a vehicle hybrid drive train comprising an internal combustion engine and electric machine whose torque is applicable to a drive output of the drive train. The drive train comprises a clutch arranged between the internal combustion engine and electric machine, an oil pump connected in the drive train downstream of the clutch in relation to the internal combustion engine, and the oil pump can be driven by the internal combustion engine and the electric machine, and a transmission which comprises a shifting elements for producing various gear ratios and which is supplied with hydraulic fluid by the oil pump in an operating-status-dependent manner. The speed of the electric machine is set independently of the speed of the internal combustion engine, in order to supply the transmission with a flow of a volume hydraulic fluid required for the operating point of the transmission present at the time.

11 Claims, 1 Drawing Sheet

U.S. PATENT DOCUMENTS

| | | |
|---|---|---|
| 8,155,848 B2 * | 4/2012 | Kobayashi et al. ............. 701/66 |
| 2005/0079942 A1 | 4/2005 | Bauknecht et al. |
| 2006/0048516 A1 | 3/2006 | Tenbrock et al. |
| 2006/0137920 A1 | 6/2006 | Aoki et al. |
| 2006/0272869 A1 | 12/2006 | Hidaka et al. |
| 2008/0011529 A1 * | 1/2008 | Hoher et al. ................. 180/65.2 |

FOREIGN PATENT DOCUMENTS

| | | |
|---|---|---|
| DE | 603 07 657 T2 | 12/2006 |
| DE | 60 2005 005 096 T2 | 6/2008 |
| EP | 1 336 773 A2 | 8/2003 |
| EP | 1 731 802 A2 | 12/2006 |

* cited by examiner

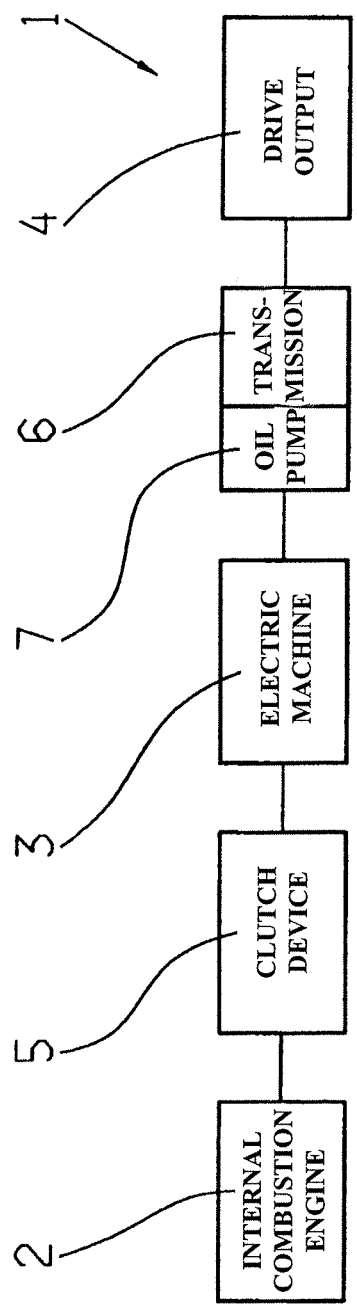

METHOD FOR OPERATING A VEHICLE HYBRID DRIVE TRAIN HAVING AN INTERNAL COMBUSTION ENGINE AND HAVING AN ELECTRIC MACHINE

This application is a National Stage completion of PCT/EP2009/065350 filed Nov. 18, 2009, which claims priority from German patent application serial no. 10 2008 044 272.0 filed Dec. 2, 2008.

FIELD OF THE INVENTION

The invention concerns a method for operating a vehicle hybrid drive train having an internal combustion engine and having an electric.

BACKGROUND OF THE INVENTION

In automatic transmissions known from prior practice, for supplying oil to the hydraulic system of the transmission and transmitting lubrication a mechanical pump device integrated inside the transmission device is usually provided in each case. The oil pump devices are each operated at the rotational speed of the transmission input, which usually corresponds to the speed of an internal combustion engine. In such a case the mechanical oil pump devices are each optimized to the speed range of the internal combustion engine, which preferably corresponds to 600 to 7000 revolutions per minute.

Transmission devices of vehicle hybrid drive trains, which in addition to an internal combustion engine also comprise an electric machine for driving the vehicle, are subjected to loads during the operation of the vehicle even when the internal combustion engine is switched off. For that reason, to avoid damage and to keep the transmission device ready for operation, the transmission devices have even then to be supplied with hydraulic fluid. To fulfill that requirement, when the internal combustion engine is switched off the transmission devices are often supplied with the desired hydraulic fluid volume flow by means of an electric auxiliary pump. Then, even when the internal combustion engine is switched off and the vehicle is stationary a gear can be engaged in the area of the transmission device, a parking lock can be disengaged, particularly in a transmission device designed with an E-mechanism, a gear engaged in the transmission device can be maintained by continuing the oil supply and compensating leakage flows, and a starting process of a vehicle can be carried out to the extent desired.

Moreover, by virtue of the electric auxiliary pumps gearshifts can also be carried out during electric drive operating conditions of vehicles at low rotational speeds of the transmission input, driving torques during traction or thrust operation of the hybrid drive trains can be produced, and the internal combustion engine can be started up by the electric machine.

Unfortunately, such auxiliary electric pumps give rise to high manufacturing costs and in each case take up substantial fitting space and increase the inherent weight of vehicle hybrid drive trains, all of which, however, are undesirable.

SUMMARY OF THE INVENTION

Thus, the purpose of the present invention is to provide a method for operating a vehicle hybrid drive train by means of which a transmission device of a vehicle hybrid drive train, that can be made inexpensively and which takes up little fitting space and has a low inherent weight, can be supplied with hydraulic fluid to the desired extent over the entire operating range of the vehicle hybrid drive train.

In the method according to the invention for operating a vehicle hybrid drive train comprising an internal combustion engine and an electric machine, whose torques can be applied to a drive output of the vehicle hybrid drive train, with a clutch device arranged between the internal combustion engine and the electric machine, with an oil pump device which is arranged downstream from the clutch device in relation to the internal combustion engine and which can be powered by the internal combustion engine and by the electric machine, and with a transmission device which comprises a plurality of shifting elements for producing various gear ratios and which is supplied with hydraulic fluid by the oil pump device in an operating-situation-dependent manner, a speed of the electric machine is adjusted independently or at least partially independently of the speed of the internal combustion engine, in order to supply the transmission device in each case with a hydraulic fluid volume flow as required for the respective operating point of the transmission device.

Accordingly the speed of the electric machine can be controlled independently of the speed of the internal combustion engine and without any auxiliary electric pump, in such manner that even when the internal combustion engine is switched off or when the internal combustion engine has been decoupled by activating the clutch device, the mechanical oil pump device can be driven by the electric machine to the desired extent and can therefore supply the transmission device with sufficient oil for the operating point of the transmission device or the hybrid transmission at the time.

Thus, for example, while the vehicle is at rest and with the internal combustion engine switched off or decoupled, the oil supply to the transmission device can be maintained by appropriately powering the oil pump device by means of the electric machine in order to control shifting elements in the transmission device that are engaged in the force flow of the transmission device with a minimum pressure depending on the operating situation and to cover leakages in the hydraulic system of the transmission device. This can preferably be done by an electric machine rotational speed for example of 200 revolutions per minute, for which purpose it may be necessary to optimize the oil pump device or design it for the operating range.

The speed of the electric machine can preferably be lowered to values at which, readiness of the transmission device for operation can be maintained by a minimum oil supply, such that the transmission capacity of the shifting elements of the transmission device and any drag torques that occur in the area of the shifting elements are then reduced.

Thus, the transmission devices of vehicle hybrid drive trains operated in accordance with the invention can be supplied to the desired extent with hydraulic fluid over the entire operating range of the vehicle hybrid drive train without an auxiliary electric pump, so that compared with hybrid drive trains having auxiliary electric pumps, such hybrid drive trains can be produced more cheaply, take up less fitting space and have lower inherent weight.

In an advantageous variant of the method according to the invention, the speed of the electric machine when the vehicle is at rest or nearly so, corresponds to an at-rest speed value which is lower than an idling speed of the internal combustion engine, whereby the oil pump device driven by the electric machine keeps the shifting elements at least partially in the engaged condition in order to maintain a current operating condition of the transmission device.

If, while maintaining the transmission device's readiness to operate, any further activities relevant to oil pressure or volume have to take place in the transmission device, the speed of the electric machine must be varied correspondingly in order to be able to maintain the operating condition of the transmission device desired at the time.

Thus, in a further variant of the method according to the invention, it is provided that the speed of the electric machine when the vehicle is at rest or nearly so, is increased starting from the at-rest speed value, if there is a call for a gear to be engaged in the transmission device starting from a neutral operating condition during which a force flow of the vehicle's hybrid drive train is interrupted in the area of the transmission device.

In a further variant of the method according to the invention, when the vehicle is at rest or nearly so the speed of the electric machine is increased if there is a call for a gear change from a starting gear to a higher gear step or from a higher gear step to a starting gear.

In another variant of the method according to the invention, when the vehicle is at rest or nearly so the speed of the electric machine is increased starting from the at-rest speed value if the disengagement of a parking lock device is called for.

In addition or alternatively, the speed of the electric machine is increased starting from the at-rest speed value if a vehicle starting process is called for or if starting the internal combustion engine is called for.

During driving operation, i.e. at a vehicle speed equal to or higher than zero, the speed of the electric machine is adjusted as a function of the torque to be transmitted by the transmission device. For this purpose the actuation pressure required in the transmission device for the operating mode of the transmission device is determined as a function of the driving torque to be transmitted by the transmission device and the respective corresponding, or necessary transmission capacities of the shifting elements involved, and the minimum rotational speed of the electric machine that corresponds to the required actuation pressure is computed.

Depending on the operating condition of a vehicle hybrid drive train that exists at a particular moment, the possibility exists that the electric machine speed required at the time is substantially lower than the idling speed of the internal combustion engine and the starting element of the vehicle hybrid drive train, or starting clutch, can already be engaged at very low drive output speeds or vehicle speeds, so that small power losses occur during a starting process.

BRIEF DESCRIPTION OF THE DRAWINGS

Further advantages and advantageous further developments of the invention emerge from the claims and the example embodiment whose principle is described with reference to the drawing.

The single FIGURE in the drawing shows a very diagrammatic representation of a vehicle hybrid drive train, with reference to which the procedure according to the invention will be explained in more detail.

DETAILED DESCRIPTION OF THE PREFERRED EMBODIMENTS

The figure shows a vehicle hybrid drive train 1 with an internal combustion engine 2 and an electric machine 3, whose torques can be applied to a drive output 4 of the vehicle hybrid drive train 1. Between the internal combustion engine 2 and the electric machine 3 is arranged a clutch device 5 by means of which the internal combustion engine 2 can be connected in a rotationally fixed manner to the electric machine 3 or the internal combustion engine 2 can be decoupled from the other parts of the vehicle hybrid drive train.

In addition, a transmission device 6 is provided between the electric machine 3 and the drive output 4 and comprises a plurality of shifting elements for producing various gear ratios and which is supplied with hydraulic fluid, as a function of the operating situation, by an oil pump device 7 arranged on the transmission input side. Depending on the operating status of the clutch device 5, the oil pump device 7 can be driven both by the internal combustion engine 2 and by the electric machine 3, in such manner that when the clutch device 5 is disengaged and the vehicle is at rest the oil pump device 7 is driven essentially by the electric machine 3. In the present case the oil pump device 7 is arranged in a housing of the transmission device 6 and, during an appropriate force flow in the transmission device, can also be driven from the drive output 4 during thrust operation of the vehicle's hybrid drive train 1.

When the vehicle is at rest and the internal combustion engine 2 is switched off, the rotational speed of the electric machine 3 is set to an at-rest speed value which is lower than an idling speed of the internal combustion engine 2. Then, the oil pump device 7 driven by the electric machine 3 provides a defined delivery volume that is sufficient to keep the shifting elements of the transmission device 6 in an at least partially engaged condition in order to maintain a current operating status of the transmission device 6, and in addition to compensate for leakage losses in the area of the hydraulic system of the transmission device 6. The operating status of the transmission device 6 corresponds essentially to a neutral condition during which a force flow of the vehicle's hybrid drive train 1 is interrupted in the area of the transmission device 6. In the present example embodiment the at-rest speed value is in a speed range of around 180 to 220 revolutions per minute, and the oil pump device 7 is optimized for that operating range.

At the level of the at-rest speed range, the speed of the electric machine 3, compared with the idling speed of the internal combustion engine 2, is reduced in such manner that there is a minimum oil supply to the transmission device 6 so that the transmission device 6 is, to a certain extent, ready for operation, whereas the transmission capacity of the shifting elements and drag torques existing in the area of the shifting elements are reduced. Accordingly, with the vehicle at rest and in combination with the then also lower transmission input speed in the area of the transmission device 6, power losses are lower.

Starting from the operating status of the vehicle's hybrid drive train described above, various requirements which result in a change in the operating status of the vehicle's hybrid drive train lead to an increased hydraulic volume demand in the area of the transmission device 6, which can only be covered by increasing the speed of the electric machine.

For example, such a requirement is a call for engaging a gear in the transmission device starting from the neutral operating condition of the transmission device 6, or a call for releasing a parking lock device. Furthermore, when starting of the internal combustion engine, or a vehicle starting process are called for, the speed of the electric machine 3 is also increased from the at-rest speed value in order to enable the transmission device 6 to carry out the respective necessary functions.

Moreover, the speed of the electric machine is increased when there is a demand for a gear change from a first gear step or a starting gear to a second or higher gear, or for a downshift from a higher or second gear to the first gear or the starting gear of the transmission device 6.

During driving operation, i.e. at a vehicle speed equal to or greater than zero, above all else the torque to be transmitted by the transmission device 6 and the respective transmission capacities of the shifting elements of the transmission device 6 to be set during operation, are the operating parameters to be taken into account for determining the necessary hydraulic pressure in the transmission device 6 and hence the minimum drive input speed of the electric machine 3.

This results from the fact that the shifting elements require the transmission capacity needed for transmitting the driving torque and must therefore be acted upon by the corresponding actuation pressure. In certain operating conditions of the vehicle's hybrid drive train 1, the rotational speed of the electric machine 3 required for this is considerably lower than the idling speed of the internal combustion engine 2, and for that reason a starting element or starting clutch of the vehicle's hybrid drive train in the area of the transmission device 6 can already be engaged at very low drive output speeds or vehicle speeds, and only small power losses occur during a starting process of the vehicle.

By virtue of the method according to the invention, a transmission device of a vehicle hybrid drive train can be supplied with a hydraulic fluid volume flow required, depending on the operating situation, over the entire operating range of a vehicle hybrid drive train, without any additional auxiliary electric pump device, so that compared with vehicle hybrid drive trains known from the prior art, vehicle hybrid drive trains operated according to the invention can be produced more cheaply and are characterized by taking up less structural fitting space and by a lower inherent weight.

INDEXES

1 Vehicle hybrid drive train
2 Internal combustion engine
3 Electric machine
4 Drive output
5 Clutch device
6 Transmission device
7 Oil pump device

The invention claimed is:

1. A method of operating a vehicle hybrid drive train (1) comprising an internal combustion engine (2) and an electric machine (3) which are connected to the vehicle hybrid drive train such that torque from both the internal combustion engine and the electric machine is transmittable to a drive output (4) of the vehicle hybrid drive train (1), a clutch device (5) arranged between the internal combustion engine (2) and the electric machine (3) such that the internal combustion engine is roationally fixable to the electric machine, an oil pump device (7) arranged in the vehicle hybrid drive train (1), downstream of the clutch device (5), in relation to the internal combustion engine (2), and drivable by both the internal combustion engine (2) and by the electric machine (3), and a transmission device (6) which comprises a plurality of shifting elements for producing various gear ratios and which is supplied with hydraulic fluid by the oil pump device (7) in an operating-status-dependent manner such that a speed of the electric machine (3) is set, independently of a speed of the internal combustion engine (2), in order to supply the transmission device (6), in each case, with a hydraulic fluid volume flow required for an operating point of the transmission device (6) present at the time, the method comprising the steps of:

corresponding the speed of the electric machine (3) to an at-rest speed value which is lower than an idling speed of the internal combustion engine (2), when the vehicle is at least approximately at rest, such that the oil pump device (7) driven by the electric machine (3) maintains the shifting elements in an at least partially engaged condition so as to maintain a current operating status of the transmission device (6), and increasing the speed of the electric machine (3), in a range when the vehicle is at rest, when there is at least one of a shift demand for a gear change from a starting gear to a higher gear step and a shift demand for a gear change from a higher gear step to a starting gear.

2. The method according to claim 1, further comprising the step of, when the vehicle is at least approximately at rest and starting from the at-rest speed value, increasing the speed of the electric machine (3) when there is a demand to engage a gear in the transmission device (6), starting from a neutral operating condition during which a force flow of the vehicle's hybrid drive train (1) is interrupted in an area of the transmission device (6).

3. The method according to claim 1, further comprising the step of, starting from the at-rest speed value, increasing the speed of the electric machine (3) if a starting process of the vehicle is called for.

4. The method according to claim 1, further comprising the step of, starting from the at-rest speed value, increasing the speed of the electric machine (3) if starting the internal combustion engine is called for.

5. The method according to claim 1, further comprising the step of, when the speed of the vehicle is greater than zero, setting the speed of the electric machine (3) as a function of the torque to be transmitted by the transmission device (6).

6. A method of operating a hybrid drive train (1) of a vehicle which comprises an internal combustion engine (2) and an electric machine (3) which are both drivably connectable with a drive output (4) of the drive train (1), a clutch device (5) arranged in the drive train (1), between the internal combustion engine (2) and the electric machine (3) such that the internal combustion engine is rotationally fixable to the electric machine, an oil pump device (7) arranged in the drive train (1) downstream of the clutch device (5) in relation to a flow of power from the internal combustion engine (2) to the drive output (4), the oil pump device (7) drivably connectable with the internal combustion engine (2) and the electric machine (3), and a transmission (6) comprises a plurality of shifting elements which are actuatable to implement various gear steps, the method comprising the steps of:

driving the oil pump device (7) with the electric machine (3) and adjusting a rotational speed of the electric machine (3) independent of a rotational speed of the internal combustion engine (2) to adjust the drive of the oil pump device (7) and a supply of oil to the transmission (6) and the plurality of shifting elements depending an oil volume flow required for a currently operating status of the drive train (1);

adjusting the rotational speed of the electric machine (3), independent of the rotational speed of the internal combustion engine (2), such that when the vehicle is approximately at rest, the rotational speed of the electric machine (3) is at an at-rest speed which is lower than an idling speed of the internal combustion engine (2), such that the oil pump device (7), driven by the electric machine (3), maintains at least partial actuation of the shifting elements in a current operating status of the transmission (6); and increasing the rotational speed of the electric machine (3), to increase the drive of the oil pump device (7), when the vehicle is at rest and when a demand is made for at least one of a gear change from a starting gear to a higher gear step and a gear change from a higher gear step to the starting gear; and increasing the rotational speed of the electric machine (3), from the at-rest speed, when the vehicle is at least approximately at rest, if a demand is made for disengaging a parking lock device.

7. The method according to claim 6, further comprising the step of increasing the rotational speed of the electric machine (3) from the at-rest speed, when the vehicle is at least approximately at rest and a demand is made for a gear change in the transmission device (6) from a neutral operating condition, during which a flow of power in the hybrid drive train (1) is interrupted in the transmission device (6).

8. The method according to claim 6, further comprising the step of increasing the rotational speed of the electric machine (3), from the at-rest speed, if a vehicle starting process is requested.

9. The method according to claim 6, further comprising the step of increasing the rotational speed of the electric machine (3), from the at-rest speed, if starting the internal combustion engine is requested.

10. The method according to claim 9, further comprising the step of setting the rotational speed of the electric machine (3), when the speed of the vehicle is greater than zero, as a function of torque to be transmitted by the transmission device (6).

11. A method of operating a vehicle hybrid drive train (1) comprising an internal combustion engine (2) and an electric machine (3) whose torque is applied to a drive output (4) of the vehicle hybrid drive train (1), a clutch device (5) arranged between the internal combustion engine (2) and the electric machine (3), an oil pump device 7 arranged in the vehicle hybrid drive train (1), downstream of the clutch device (5), in relation to the internal combustion engine (2), and drivable by both the internal combustion engine (2) and by the electric machine (3), and a transmission device (6) which comprises a plurality of shifting elements for producing various gear ratios and which is supplied with hydraulic fluid by the oil pump device (7) in an operating-status-dependent manner such that a speed of the electric machine (3) is set, independently of a speed of the internal combustion engine (2), in order to supply the transmission device (6), in each case, with a hydraulic fluid volume flow required for an operating point of the transmission device (6) present at the time, the method comprising the steps of:

corresponding the speed of the electric machine (3) to an at-rest speed value which is lower than an idling speed of the internal combustion engine (2), when the vehicle is at least approximately at rest, such that the oil pump device (7) driven by the electric machine (3) maintains the shifting elements in an at least partially engaged condition so as to maintain a current operating status of the transmission device (6), increasing the speed of the electric machine (3), in a range when the vehicle is at rest, when there is at least one of a shift demand for a gear change from a starting gear to a higher gear step and a shift demand for a gear change from a higher gear step to a starting gear, and when the vehicle is at least approximately at rest and starting from the at-rest speed value, increasing the speed of the electric machine (3) if there is a demand for disengaging a parking lock device.

\* \* \* \* \*